UNITED STATES PATENT OFFICE

CARNIE B. CARTER, OF PITTSBURGH, PENNSYLVANIA, ASSIGNOR TO S. KARPEN & BROS., OF CHICAGO, ILLINOIS, A CORPORATION OF WEST VIRGINIA

MANUFACTURE OF ETHERS

No Drawing.    Application filed August 17, 1925.    Serial No. 50,835.

The present invention relates to the manufacture of normal and mixed ethers by the action of aqueous acids upon alcohols.

The ethers are dehydration products of the alcohols and are usually prepared both in the laboratory and commercially by acting upon the alcohols with hot concentrated dehydrating agents such as concentrated sulphuric, phosphoric and benzene sulphonic acids. The hot concentrated acids produce the ether by elimination of one mol of water from two mols of the alcohol as illustrated in the following general equations, in which R and R' represent hydrocarbon radicals such as methyl ($CH_3$), ethyl ($C_2H_5$), propyl ($C_3H_7$), etc.:

(a) $2\ ROH = ROR + H_2O$
(b) $ROH + R'OH = ROR' + H_2O$

If two mols of the same alcohol are condensed, equation (a), a normal ether is produced; if one mol each of two different alcohols are condensed, equation (b), a mixed ether is produced.

Theoretically, the action of the acid in the dehydration is purely catalytic and a given quantity of acid should be capable of transforming an unlimited amount of alcohol into ether. Practically, such is not the case; the acid is destroyed rapidly due to side reactions, and a part of the alcohol is decomposed with the formation of free carbon and tarry residues which rapidly contaminate the acid and render it unfit for further use. The ether resulting from such actions is also contaminated with by-products.

I have discovered that by utilizing sufficiently dilute acids, it is possible to avoid excessive destruction of the acid and at the same time produce substantially quantitative yields of a highly pure ether. The following will serve to illustrate the nature of the improved process.

A solution of the following composition:

|  | Grams | Per cent | Mol ratios |
|---|---|---|---|
| Ethyl alcohol | 69 | 50.7 | 3 |
| Sulphuric acid | 49 | 36.0 | 1 |
| Water | 18 | 13.3 | 2 |

One hundred cc. of this solution was placed in a round bottom flask under a Liebig condenser and brought to boiling. Water at a temperature of 45° to 50° C. was circulated through the jacket of the condenser, the water entering the jacket at the top and leaving at the bottom. The vapors rich in ethyl ether leaving the top of the condenser were led into a large test tube immersed in ice water where they were condensed. Boiling was continued for three hours during which time 38 cc. of condensate was collected in the test tube. Careful fractional distillation of the condensate gave somewhat more than 20 cc. of ether substantially free from alcohol. The original solution contained 53 grams of alcohol equivalent to 42.8 grams of ether, whence it follows that 33.9% of the alcohol was converted into ether. There also was recovered 18 cc. of substantially pure alcohol or 27.3% of the alcohol taken. About 61% of the alcohol used thus was removed from the field of action and about 39% remained behind in the flask.

The composition of the liquor remaining in the flask was approximately as follows:

| Ethyl alcohol | 20.7 grams | 27.3% |
|---|---|---|
| Sulphuric acid | 37.7 grams | 49.8% |
| Water | 17.3 grams | 22.9% |

Thus, the alcohol concentration fell from about 51% to 27%; the acid concentration rose from 36% to approximately 50%; and the water concentration rose from about 13% to 23%.

This residual liquor was boiled for an additional hour during which time 13 cc. of condensate carrying 8.5 cc. of ether and approximately 4.5 cc. of alcohol was recovered. During the entire experiment approximately 82% of the alcohol was removed from the field of action, 48% as ether and 34% as unattacked alcohol, and about 18% still remained in the residual liquor.

Although the example given above does not show the quantitative character of the process, nevertheless, the reaction does lead to substantially quantitative yields. The following example in which methyl alcohol is used will serve to illustrate this point. It should be noted in this connection that, owing to the lack of exact analytical methods for ethers, it is very difficult to obtain exact numerical data on these reactions. Methyl ether, however, can be handled with a great deal more accuracy than ethyl ether due to the fact that it is a vapor at ordinary temperatures. It has been used for this reason for the more exact quantitative studies.

A solution was prepared of the following composition:

| | | |
|---|---|---|
| Methyl alcohol | 4.0 grams | 17.3% |
| Sulphuric acid | 12.3 grams | 53.2% |
| Water | 6.8 grams | 29.5% |

This solution was placed in a round bottom flask and boiled under a reflux condenser with tap water flowing through the condenser jacket. Boiling was continued for seven hours during which time 1487 cc. of ether vapor was evolved; theoretically the 4 grams of methyl alcohol used should produce under the conditions of the experiment 1589 cc. The yield on this basis is 93.8%. It is to be noted that some small loss of alcohol through the condenser as the ether is evolved is unavoidable since these vapors are substantially saturated with alcohol vapors during their passage through the condenser. Taking such loss of alcohol into consideration the yield from reacted alcohol was about 100%.

The fact that boiling was continued for seven hours does not mean that we are dealing with a very slow reaction. During the later stages of the experiment the amount of alcohol in the solution was very small, thus causing a very slow evolution of ether. Somewhat more than a third of the total gas evolved was evolved during the first thirty minutes and 57% was evolved during the first hour, from which it appears that the reaction may be fairly rapid under proper conditions.

At the close of the experiment just described, the residual liquor was composed exclusively of water and acid in the proportions of approximately 40% water and 60% sulphuric acid. In the case of the example first given, ignoring the alcohol which remained at the time when the experiment was stopped, the water and acid were present in the residual liquor in the proportion of 32% water and 68% sulphuric acid. These acid concentrations represent good practicable working values; ethers are produced readily with sufficient velocity under ordinary pressures for practicable purposes, the ethers are produced in a high state of purity and there is little or no destruction of the acid under conditions such as are described in the examples given. It is to be understood, however, that the relative proportions of water, acid and alcohol can be varied over rather wide ranges without impairment of the process. The following summary of a series of three experiments will serve to illustrate how the three substances may be varied over a considerable range of concentration and still produce ether at a high rate. The three mixtures were subjected to the same boiling treatment accorded that in the example last given above.

| | Grams | Mol ratios | Per cent |
|---|---|---|---|
| Mixture A: | | | |
| Sulphuric acid | 12.3 | 1 | 35.6 |
| Methyl alcohol | 20.0 | 5 | 57.8 |
| Water | 2.3 | 1 | 6.6 |
| Mixture B: | | | |
| Sulphuric acid | 12.3 | 1 | 42.7 |
| Methyl alcohol | 12.0 | 3 | 41.7 |
| Water | 4.5 | 2 | 15.6 |
| Mixture C: | | | |
| Sulphuric acid | 12.3 | 1 | 53.2 |
| Methyl alcohol | 4.0 | 1 | 17.3 |
| Water | 6.8 | 3 | 29.5 |

Mixture A evolved more than 3000 cc. of ether during four hours or approximately an equivalent of two of the five mols of alcohol taken; mixture B evolved more than 3300 cc. during two and one half hours, or an equivalent of more than two of the three mols taken; mixture C evolved 849 cc. during one hour or an equivalent of more than a half of the one mol of alcohol taken.

If we ignore the alcoholic content of the three mixtures above and calculate the composition of the aqueous acid mixture we find the approximations—

| | Acid | Water |
|---|---|---|
| Mixture A | 84% | 16% |
| Mixture B | 73% | 27% |
| Mixture C | 64% | 36% |

Now it is possible that if an acid of as high a concentration as A were treated with one mol of alcohol instead of five there would be an excessive amount of acid destroyed, and the ether would be unduly contaminated. On the other hand, if an acid of about 60% were employed, five mols of alcohol probably would dilute the acid to such an extent that ether would be evolved too slowly for practicable purposes. For example, it is found that 25 cc. of a solution containing 25% acid, 25% water and 50% methyl alcohol evolves ether at a rate of 50 to 60 cc. per hour, a rate which is rather low for practical purposes, yet the strength of the aqueous acid here is 50%. Thus, it appears that alcohol may be present as a supplemental diluent. In other words, by keeping alcohol present in rather large excess, the percentage of acid with respect to water present may be higher than would otherwise be safe practice where the purity of the product and the conserving of acid are primary considerations. It is to be noted that these effects are not due solely to the change in acid concentration but in large measure to temperature effects. The last named mixture due to the large alcoholic content boils at a temperature much lower than a 50% acid containing say 5 to 10% alcohol. If pressure were applied and a temperature employed say in the neighborhood of 150° C. a mixture of this composition could be employed successfully since the increased temperature would enable the ether to be generated at a higher rate.

It will appear from these considerations that wide limits of acid concentration for successful operation are permissible. It may be stated, however, that for the operation of the process at atmospheric pressures an aqueous acid varying in acid content from 50% to 85% may be employed; the aqueous acid of the lower acid content should, as pointed out above, be treated with less alcohol than the more concentrated acid. Thus, for example, in the practice of the process with an 80% aqueous acid, it is advisable to employ as much as five mols of alcohol and it may be desirable to use even more, for each mol of acid taken. On the other hand, if the process is practiced with an aqueous acid of about 50 or 60% it is desirable to materially reduce the alcohol content and to use alcoholic concentrations of the order of one to two mols of alcohol for each mol of acid taken. For acids of intermediate concentrations, the alcohol present in the reaction mixture may vary in accordance with the principle indicated.

It follows from these considerations that acids varying in concentration from 50% to 85% can be used in the practice of the process at ordinary pressures. For acids of say 30 to 50% strength increased pressure would be necessary in order to obtain reaction velocities of sufficient magnitude to enable the process to compare favorably with the higher acid concentrations mentioned, at atmospheric pressures. Practical considerations, of course, will set the lower limit of acid concentration; the reaction velocity decreases rapidly, other things being equal, with decreasing acid concentration and in order to compensate for the slower rate of reaction it is necessary to operate at much higher temperatures and pressures, which calls for more expensive plant equipment. It is not desirable, in any event, to employ an acid concentration of less than about 40%. It is to be emphasized, however, that this figure refers to the strength of the acid used and not the reaction mixture which may contain one or more mols of alcohol for each mol of acid taken.

As regards the temperature at which the process can be operated, it is to be understood that this factor also may be varied over rather wide limits, depending upon conditions. It is found, for example, that equilibrium is established in a solution containing one mol of methyl alcohol, one and one-half mols of sulphuric acid and two and two-tenths mols of water at a temperature of 150° C. in about ten minutes; at 130° C. in about thirty minutes; and at 100° C., in about four hours. Less time is required for equilibrium to establish itself at these temperatures in solutions of higher acid concentrations and more time is required in solutions of lower acid concentrations. It is obvious therefore that the working temperature will be determined very largely by the relative proportions of the water, alcohol and acid in the mixture under treatment. These statements apply to establishment of equilibrium as illustrated above, and they apply, also, to those examples which have been given earlier in which ether is evolved continuously from a boiling solution of alcohol, water and acid.

It has been shown in an earlier example (mixture A) that a mixture of one mol ratio of sulphuric acid, one mol ratio of water and five mol ratios of methyl alcohol evolved more than 3000 cc. of ether during four hours boiling. This volume of ether is equivalent to nearly two fifths of the alcohol taken. The residual liquor accordingly contained one mol ratio of acid, slightly more than three mol ratios of alcohol and nearly two mol ratios of water, since each two mols of alcohol consumed produces one mol of water. The original solution had a boiling point of 77° C. When two mols of alcohol had been consumed the boiling point had risen to 88° C. and when four mols of alcohol had been consumed the boiling point had risen to 110° C. The composition at this time corresponded to mixture C; the consumption of the fifth mol of alcohol leaves a residual solution containing one mol of acid and three and one-half mols of water or an aqueous acid solution which contains 60% acid and 40% water. Such an acid solution boils at about 135° C.

It is evident from these results that there has been a continuous change in the reaction temperature as the reaction progressed, the first portions of the ether being evolved at 77° C. and the last portions at temperatures in the neighborhood of 135° C. Similar temperature ranges are obtained for other alcohols; the higher boiling alcohols, however, when taken in the same molecular proportions will show a higher initial boiling temperature although they will show the same final boiling point temperature inasmuch as the final temperature will be that of the 60% acid. Thus, an ethyl alcohol mixture will boil initially at a higher temperature than methyl alcohol and a propyl alcohol mixture will boil initially higher than ethyl alcohol. The boiling point of methyl alcohol is 65° C. Hence the lower boiling limit of these methyl alcohol-water-acid solutions containing more than five mols of alcohol for each mol of acid is between 65° and 77° C.

The use of sulphuric acid is preferred. However, any suitable mineral acid, such as phosphoric acid, and benzene sulphonic acid may be used. It is necessary, however, when using phosphoric acid to employ higher acid concentrations than is required when sulphuric acid is employed. It is preferred therefore to employ the cheaper and more efficient sulphuric acid than either of the more expensive materials, phosphoric or benzene sulphonic acids. The organic acids are not applicable, and the halogen acids are not desirable, it being preferred to employ the high-boiling, or substantially non-volatile, mineral acids whose esters are high-boiling or substantially non-volatile.

Brief reference may be made to the probable mechanism of the alcohol-to-ether and ether-to-alcohol reactions. It is generally assumed that ethers are produced from alcohols in accordance with the following equations in which methyl alcohol and methyl ether are typical:

(c) $CH_3OH + H_2SO_4 = CH_3HSO_4 + H_2O$
(d) $CH_3HSO_4 + CH_3OH = CH_3-O-CH_3 + H_2SO_4$.

The reactions are not written reversibly, although they should be so written. However, these equations are not adequate to explain the behavior of mixtures of acid, alcohol and water when heated under conditions which do not permit of the escape of any of the reacting substances. It would be expected on the basis of these equations, for example, that for a given initial alcohol concentration, when a mixture of acid, alcohol and water is heated at any given temperature until equilibrium is established, the amount of ether present at equilibrium would be greater the lower the water concentration and the higher the acid concentration. Thus, it is to be expected that with a given alcohol concentration a 40% acid will contain less ether at equilibrium than will acids of high concentration. Such, however, is not the case as may be seen from the following table. The table shows the results of a series of experiments in which the initial alcohol concentration is the same, the acid concentration alone being varied. All experiments were conducted at 150° C. and all reactions were followed until equilibrium was established. Column one shows the acid concentration and column two the amount of ether present in the equilibrium mixture.

| Acid concentration | Ether present |
|---|---|
| 40% | 57% |
| 50% | 38% |
| 75% | 8% |
| 95% | 2% |

These results are not to be predicted on the basis of the equations above. Other anomalies have also been observed which likewise can not be explained on this basis.

The mechanism of the reactions probably is correctly represented by the following series of three reversible reactions:

(e) $CH_3OH + H_2SO_4 \rightleftharpoons CH_3HSO_4 + H_2O$
(f) $CH_3HSO_4 + CH_3OH \rightleftharpoons (CH_3)_2SO_4 + H_2O$
(g) $(CH_3)_2SO_4 + H_2O \rightleftharpoons CH_3-O-CH_3 + H_2SO_4$ Without entering into a lengthy discussion of experimental results, it can be stated that these equations seem to agree with the facts as far as investigations have been carried out in an effort to substantiate them. The results tabulated above, as well as other seemingly anomalous results, can be explained with the aid of the equations.

In practice, ethers may be produced in substantially the same way as described in the small-scale experiments. A suitable distilling vessel of glass, enameled metal, acid-resisting metals, etc. equipped with suitable forms of still-heads, or fractionating columns, and provided with suitable condensers, is charged with aqueous acid solution, which may vary in acid content from about 40% to 80%, together with the alcohol in the proportion of one to five or even more mols of alcohol for each mol of acid taken, the amount of alchol taken being determined largely by the strength of the acid. If acid of high concentration, such, for example, as 70% or 80%, is used larger volumes of alcohol are necessary than if acids of 40% to 50% are employed. Preferably acid of the higher concentration is employed with large volumes of alcohol. Such procedure insures high reaction velocity at comparatively low temperatures and avoids side reactions which might otherwise occur if high concentrated acid is brought into contact with the alcohol at high temperature. As the alcohol is consumed in such solutions, water is formed, the temperature rises, and, as a consequence of these effects, the alcohol at the more elevated temperatures is in contact with the more dilute acid. The fractionating columns or still-heads are so designed and so adjusted that the alcohol and ether escaping from the reaction vessel are separated, the alcohol being returned to the reaction mixture and the ether collected in the receiver. Distillation will be continued in this manner until all, or nearly all, alcohol has been converted into ether. Water will then be distilled off from the acid until it is brought again to its original strength, after which more alcohol will be added and the operation will be repeated.

The foregoing description illustrates an intermittent, or discontinuous, method of operating the process. The same procedure, with some modifications may be employed to operate the process in essentially continuous manner. The reaction vessel is equipped for the purpose with facilities for the withdrawal of the reaction liquor while operating. The reaction vessel is equipped as in the former case with suitable fractionating columns, or still-heads, condensers, receivers, etc., and is operated in the same manner, the charge preferably consisting of 60% to 70% acid together with one to three mols of alcohol for each mol of acid. As the reaction proceeds and the acid becomes more dilute as a result of the formation of water, a certain amount of the reaction liquor is removed and subjected to distillation to recover such alcohol as it contains and to remove water until the acid concentration rises to 80% or 90% when it is returned to the reaction vessel together with the necessary amount of alcohol to produce the proper concentration in the reaction vessel.

The process when operating under properly balanced conditions requires the continuous, or intermittent, addition of strong acid and alcohol, the continuous removal of ether, preferably, and the continuous, or intermittent, removal of diluted reaction liquor, which is concentrated and used as a source of supply for the strong acid.

It is preferred to operate the process so that the equilibrium reactions are displaced toward the ether side as rapidly as possible. It will be evident from the discussions which have been given that the reactions are constantly tending towards a state of equilibrium. In order to disrupt this equilibrium and produce ether at a high rate, it is necessary to remove ether from the field of action as soon as possible after its production. The rate at which ether is formed in any given mixture, therefore, will depend in large measure upon the rate of boiling and the efficiency of the still-head which separates the alcohol from the ether and returns the alcohol to the reaction mixture. The lower the ether concentration in the reaction mixture, the more rapidly will ether be formed. As has been pointed out, the improved process enables a very pure ether to be produced and conserves the acid used. The process is one which can be practiced with facility and which enables ether to be produced economically. Because of the purity of the product, the importance of the process in producing ethyl ether for use as an anæsthetic will be appreciated.

In the appended claim, the expressions "aqueous acid" is intended to cover the use of acid in the presence of water in a reaction between acid and alcohol, regardless of the order of mixing the materials.

The foregoing detailed description has been given for clearness of understanding only, and no unnecessary limitations should be understood therefrom, but the appended claim should be construed as broadly as permissible, in view of the prior art.

What I regard as new, and desire to secure by Letters Patent, is:

The continuous process of producing ether which consists in boiling a mixture comprising alcohol and a non-volatile aqueous mineral acid of a concentration within the approximate limits of 40–85% strength, thereby causing the evolution of ether and evaporation of alcohol; fractionally condensing the ether and alcohol; returning the condensed alcohol to the reaction vessel; introducing sufficient additional alcohol to maintain the alcohol concentration of the reaction mixture substantially in excess of one mol of alcohol for each mol of absolute acid; withdrawing liquor from the reaction vessel; effecting suitable concentration of the acid in the withdrawn liquor; and returning the concentrated acid to the reaction vessel.

CARNIE B. CARTER.